United States Patent [19]

Obara et al.

[11] 4,373,379
[45] Feb. 15, 1983

[54] METHOD AND APPARATUS FOR DETECTING DEFECTS IN A WATER COOLING SYSTEM OF A HYDROGEN-COOLED DYNAMIC ELECTRIC MACHINE

[75] Inventors: Sanshiro Obara; Ikuro Miyashita, both of Hitachi, Japan

[73] Assignee: Hitachi, Ltd., Tokyo, Japan

[21] Appl. No.: 210,170

[22] Filed: Nov. 25, 1980

[30] Foreign Application Priority Data

Nov. 26, 1979 [JP] Japan .................................. 54/151971

[51] Int. Cl.³ .................................................. G01M 3/22
[52] U.S. Cl. .................................. 73/40.5 R; 73/40.7
[58] Field of Search ............................ 73/40.7, 40.5 R

[56] References Cited

U.S. PATENT DOCUMENTS 2,675,493  4/1954  Grobel ........................ 73/40.7 X

FOREIGN PATENT DOCUMENTS 881366  7/1960  United Kingdom ................. 73/40.7

Primary Examiner—Edward R. Kazenske
Assistant Examiner—Joseph W. Roskos
Attorney, Agent, or Firm—Antonelli, Terry and Wands

[57] ABSTRACT

Presented are a method and apparatus for detecting defect in the water cooling system, e.g. cracking, of a hydrogen-cooled dynamic electric machine. The stator core of the hydrogen-cooled dynamic electric machine is cooled from its inside by cooling water circulated therethrough. When a defect such as crack is caused in the water cooling system, the hydrogen gas leaks into the cooling water. The hydrogen gas is then conveyed by the cooling water to a cooling water supply tank to which the water is recirculated and is accumulated in the upper free space in the water supply tank. Carrier air is forcibly blown into the upper free space of the water supply pipe to prevent the hydrogen concentration from being increased to a dangerous level of explosion threshold. The hydrogen concentration is measured in this state and the defect in the water cooling system is known from the measured concentration of the hydrogen gas.

10 Claims, 9 Drawing Figures

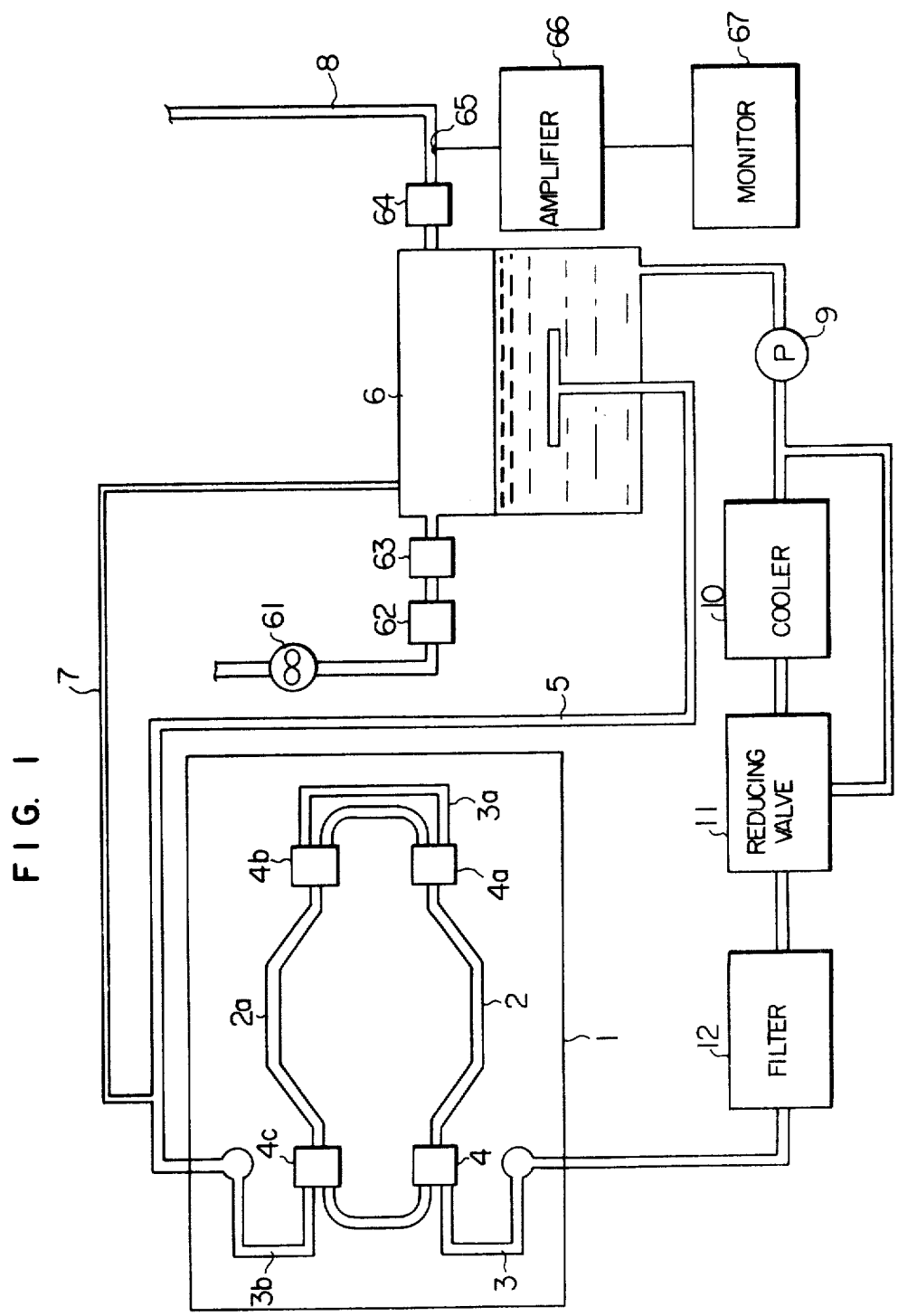

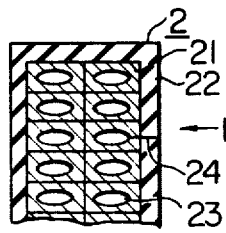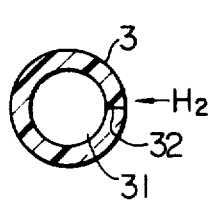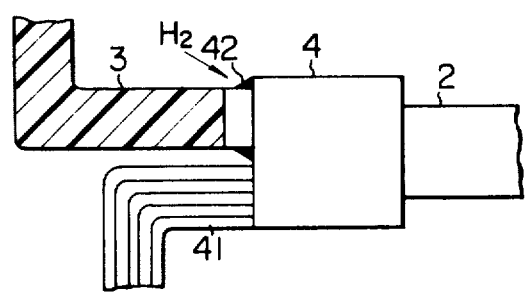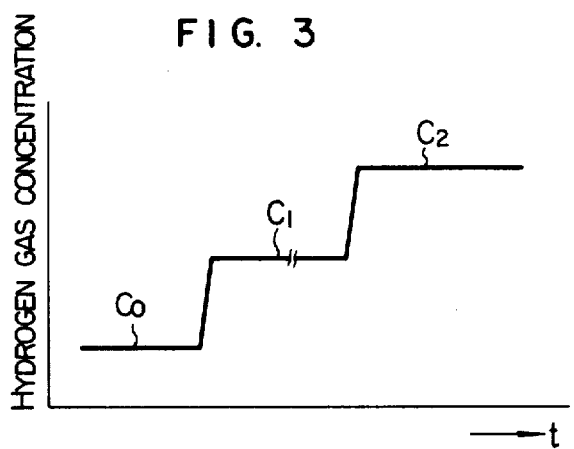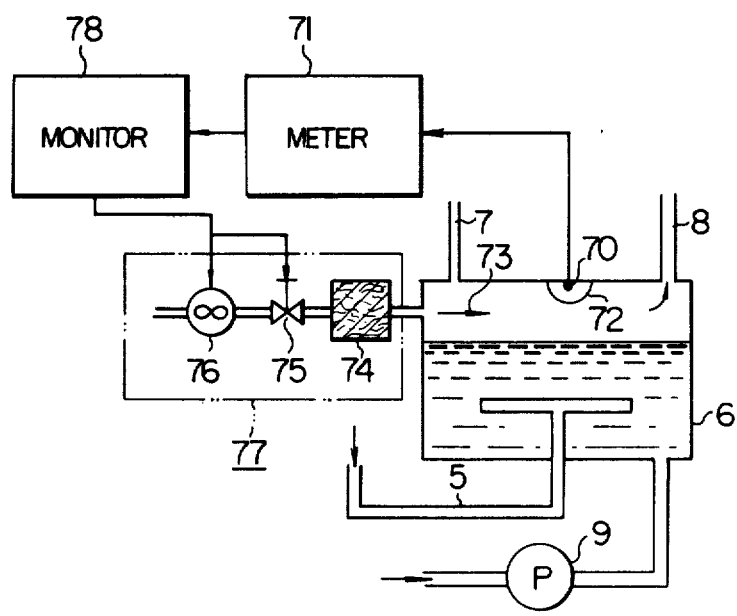

METHOD AND APPARATUS FOR DETECTING DEFECTS IN A WATER COOLING SYSTEM OF A HYDROGEN-COOLED DYNAMIC ELECTRIC MACHINE

BACKGROUND OF THE INVENTION

The present invention relates to a method and apparatus for detecting faults or defects in a cooling water system of a hydrogen-cooled dynamic electric machine and, more parrticularly, to a method and apparatus for detecting the defect occuring in the cooling water system for a stator coil of a hydrogen-cooled dynamic electric machine.

In a large-capacity dynamic electric machine such as a turbine generator, hydrogen is used to cool the stator core, rotor core and rotor coil in direct contact therewith. Also, in order to enhance the cooling effect, the stator coil is cooled by cooling water circulated therein. Namely, the stator coil is constituted by a hollow conductive member having an internal cavity through which the cooling water is circulated. The cooling water is supplied into the internal cavity of the hollow conductive member from a water supply tank by means of a pump so as to effectively cool the stator coil, and is recirculated to the water supply tank for repeated use. Thus, the stator coil is cooled from the inside by the cooling water circulated therethrough, and by hydrogen gas from the outside, so that a high cooling effect is obtained.

In this cooling system of a dynamic electric machine, the hydrogen pressure is maintained at a higher level than the cooling water pressure, so that in the event of, for example, cracking in the hollow conductive member or cooling water pipe, the hydrogen gas is leaked into the cooling water line and conveyed to the water supply tank by the water. The hydrogen gas is then accumulated at the upper free space in the water supply tank.

It is, therefore, possible to detect any defect such as cracking in the hollow conductive member or cooling water pipe by detecting the amount of hydrogen gas in the upper space of the water supply tank. Such a method is proposed, for example, in Japanese Patent Laid-Open publication No. 39803/1979. In this proposed method, the amount of hydrogen gas is detected by means of pressure. More specifically, the defect in the water cooling system is known from the time length till a predetermined pressure is reached in the water supply tank. This method, however, has a drawback. Namely, there is a danger that the hydrogen gas concentration in the water tank may reach the explosion threshold concentration which is generally 4%, when a large amount of hydrogen is accumulated. The above-mentioned Japanese Patent Laid-open No. 39803/1979 pays no specific consideration to a countermeasures for avoiding such a danger. Namely, in this proposed method, it is possible that a large amount of hydrogen gas is dangerously accumulated in the water supply tank.

Under this circumstance, it is desirable that the defect in the water cooling system is detected while the accumulation of hydrogen gas in the water supply tank is still small. It is, however, extremely difficult to judge whether the defect is taking place in the water cooling system while the amount of hydrogen gas accumulated in the tank is still small, for the following reasons. Namely, the piping of the water cooling system connected to the hollow conductive member of the stator core in the dynamic electric machine includes a teflon hose which inevitably permits the hydrogen gas to permeate therethrough. Therefore, there is always an invasion of a slight amount of hydrogen gas into the cooling water through the wall of the teflon hose and this hydrogen gas is conveyed to the water supply tank to stay in the latter. Therefore, there is always an accumulation of hydrogen gas in the water supply tank even when there is no defect in the water cooling system, although the amount of accumulation is small. For this reason, it is quite difficult to discriminate the occurrence of the defect in the water cooling system while the amount of accumulation, i.e. the concentration, of the hydrogen gas is still small.

Under this circumstance, the present invention aims as its major object at providing a method and apparatus for detecting a defect in water cooling system of a dynamic electric machine, capable of obviating the aforementioned drawbacks of the prior art.

To this end, according to the invention, there is provided a method of detecting a defect occuring in the water cooling system of dynamic electric machine in which carrier air is forcibly blown into the upper space in the water supply tank to prevent an accumulation of a large amount of hydrogen gas, and the concentration of hydrogen is measured in this state as information concerning the occurence of a defect in the water cooling system.

According to this method, the amount of accumulation in the upper space in water supply tank is very small. Even though the amount of hydrogen gas accumulated in the upper space of the water tank is increased due to a defect in the water cooling system, the hydrogen gas concentration does not reach the explosion threshold value because of the forcible circulation of carrier air in the water supply tank. Therefore, the defect in the water cooling system, if any, can be detected advantageously while avoiding a dangerous concentration of hydrogen gas in the water supply tank.

The invention also provides in another aspect apparatus suitable for use in carrying out the above-described method of the invention.

Other features and effects of the invention will become clear from the following detailed description taken in conjunction with the accompanying drawings.

FIG. 1 is a diagram schematically showing an embodiment of the invention;

FIGS. 2a, 2b and 2c are illustrations of parts of a water cooling system for a stator coil of a dynamic electric machine in which:

FIG. 2a shows in section a part of the stator core;

FIG. 2b shows in section a teflon hose; and

FIG. 2c shows in detail the construction of the connection of the piping;

FIG. 3 shows the change of the hydrogen concentration in relation to time in the first embodiment;

FIG. 4 shows a second embodiment of the invention;

Figure 5:
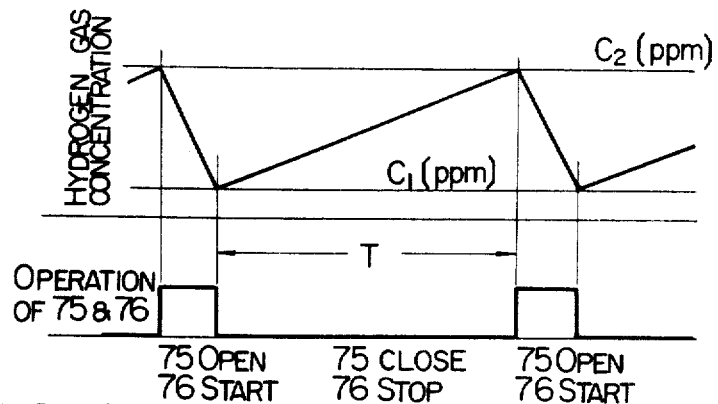
FIG. 5 shows the change of the hydrogen concentration in the second embodiment.

Referring to FIG. 1, there is shown an apparatus for detecting a defect in a water cooling system of a hydrogen-cooled dynamic electric machine, which is in this case a turbine generator, constructed in accordance with a first embodiment of the invention.

A cooling hydrogen gas is supplied at a predetermined pressure into the casing 1 of the turbine generator. The turbine generator has stator coils 2, 2a through which cooling water is circulated via a hose 3 and a connection 4, from a water supply tank 6 by means of a pump 9. The water itself is cooled by a cooler 10 disposed in the cooling water line. A part of the cooling water delivered by the pump 9 is introduced to a reducing valve 11, bypassing the cooler 10. In the reducing valve 11, the bypassing cooling water and water coming through the cooler 10 are mixed at a suitable ratio to create an optimum cooling water temperature. The cooling water after this temperature control is then introduced into the casing 1 of the turbine generator through a filter 12, and is supplied to the stator coil 2 through the hose 3. The cooling water then flown through the stator coil 2, and is recirculated to the water supply tank 6 via a connection 4a, a hose 3a, a connection 4b, a stator coil 2a, a connection 4c and a hose 3b and via a water discharge pipe 5.

In order to prevent generation of a vacuum in the discharge pipe 5, a bypass or equalizing pipe 7 is connected between the water supply tank 6 and the discharge pipe 5, thereby to equalize the pressures in the tank 6 and the pipe 5. The upper part of the space in the water supply tank 6 is maintained at atmospheric pressure by means of an atmospheric pipe 8.

As shown in FIG. 2a, each of the stator coils 2, 2a has a plurality of hollow conductors 21 encased by an insulating cover 22. The internal cavity of the hollow conductor constitutes a passage 23 for the cooling water.

Assuming here that a cracking accidentally takes place as denoted by a reference numeral 24, the hydrogen gas leaks into the cooling water passage 23 and is conveyed to the water supply tank 6 through the discharge pipe 5, and reaches finally the upper part of the space in the water supply tank 6.

Since the atmospheric pressure is maintained in the water supply tank 6 due to the presence of the atmospheric pipe 8, the hydrogen coming into the space of the water supply tank 6 is not easily relieved to the atmosphere through the atmospheric pipe 8 but stays in the upper part of the space in the water supply tank 6.

The accumulation of hydrogen gas in that space is prevented by carrier air which is forcibly introduced at a constant rate by a blower 61 through an air filter 62 and the flow meter 63 into the upper part of the space in the water supply tank 6. Therefore, the hydrogen gas reached the space in the water supply tank 6 is discharged to the atmosphere together with the carrier air of the constant flow rate.

A dehydrator or a dehumidifier 64 disposed in the atmospheric pipe 8 removes the humidity of the carrier air and hydrogen gas. The concentration of hydrogen gas in the carrier air is measured by a hydrogen gas sensor 65 provided in the atmospheric pipe 8. The hydrogen gas concentration sensor 65 produces an electric signal corresponding to the detected hydrogen gas concentration. The electric signal is then amplified by the amplifier 66 and is delivered to a hydrogen gas concentration monitor 67 so as to be monitored by the latter.

The invasion of the hydrogen gas into the water cooling system is caused not only by cracking 24 in the stator coil 2, 2a shown in FIG. 2a but also by crackings taking place at other portions such as cracking 32 taking place in the hose 3 (FIG. 2b), cracking (not shown) taking place in the weld part 42 between the hoses 3, 3a, 3b and connections 4, 4a, 4b, 4c. In FIG. 2b, the reference 31 designates a cooling water passage in the hose 3, while the reference numeral 41 in FIG. 2c designates a connection line to the stator coil 2.

Almost all parts of the hydrogen gas leaked into the cooling water is released from water into the space in the water supply tank 6, due to the reason concerning the partial pressure of the hydrogen gas constituting the water, because the hydrogen gas concentration in the upper part of space in the tank 6, maintained at atmospheric pressure, is sufficiently low.

Representing the rate of release of hydrogen gas per unit time by $Q_{H2}$[l/hr], the flow rate of the carrier air supplied by the blower 61 via filter 62 and flow meter 63 by $A_{air}$ [l/hr] and the hydrogen gas concentration measured by hydrogen gas sensor 65 by $C_{H2}$[ppm], the following equation (1) is derived.

$$Q_{H2} = Q_{air} \times C_{H2} \tag{1}$$

Therefore, by maintaining a constant flow rate of carrier air $Q_{air}$, it is possible to measure the rate of release of hydrogen gas per unit time directly from the output $C_{H2}$ from the hydrogen gas concentration sensor 65. The rate of invasion of hydrogen gas per day $Q'_{H2}$ [l/day] is obtained by multiplying the value of $Q_{H2}$ of equation (1) by 24. For instance, assuming that the hydrogen gas concentration $C_{H2}$ is 200 ppm when the flow rate $Q_{air}$ of the carrier gas is 600 [l/hr], the rate $Q_{H2}$ is calculated to be 0.12 [l/hr] and the rate per day $Q'_{H2}$ is calculated to be $Q'_{H2} = 2.9$ [l/day].

The hose 3 shown in FIG. 1 is made of teflon tube which has a certain gas permeability, so that it is possible that the hydrogen gas permeates in the wall of the hose 3 and comes into the cooling water at a small rate of several liters per day even if there is no cracking in the water cooling system. In case of a defect such as crackings in the constituents of the water cooling system as shown in FIGS. 2a to 2c, the rate of invasion of the hydrogen gas is increased drastically.

The monitor device 67 receives a signal representative of the released hydrogen gas amount through the hydrogen gas concentration sensor 65 and the amplifier 66. When the release rate of hydrogen is slightly greater than the normal rate, the monitor device 67 makes such a judgement that the leak is not so serious as to require an immediate stopping of the electric machine and makes a management control for observing or watching the tendency of increase of the hydrogen gas amount. However, when the level of the signal is too high, the monitor device 67 judges that a heavy crack that requires an immediate stopping and inspection has taken place and sends signals for actuating an alarm and display. The former crack will be referred to as "light crack" while the latter crack will be referred to as "heavy crack", hereinafter.

FIG. 3 shows the change in the hydrogen gas concentration in each case of the normal state, light crack and heavy crack. In this Figure, $C_0$, $C_1$ and $C_2$ respectively represent the hydrogen concentrations as observed when the cooling system is in the normal state, when the light crack has occured and when the heavy crack has occured.

Referring to FIG. 1, the water supply tank 6 is provided at its left and right sides with a draft pipe and bleed pie for an efficient bleeding of the hydrogen gas released to the space in the water supply tank 6. The dehumidifier or dehydrator 64 disposed upstream of the hydrogen gas concentration sensor 65 in the atmospheric pipe 8 is intended for protecting the sensor 65 against the moisture residing in the space in water supply tank 6.

In the described embodiment, a blower 61 is used for blowing the carrier air. This, however, may be substituted by a suitable compressed air source provided in the plant.

As has been described, in the first embodiment of the invention, the concentration of hydrogen gas in the space of the water supply tank is never increased to the explosion threshold because the carrier air is forcibly blown into the water tank 6.

In addition, the carrier air is blown at a constant flow rate to permit the detection of hydrogen gas concentration in the constant amount of carrier air by means of the hydrogen gas sensor. It is therefore possible to exactly detect the rate of invasion of the hydrogen gas into the cooling water to permit an accurate judgement concerning the occurrence of a defect in the water cooling system.

FIG. 4 shows a second embodiment of the invention which is also applied to the stator coil 2, 2a of a turbine generator. This Figure illustrates, therefore, only a portion which discriminates the second embodiment from the first one.

In this second embodiment, a hydrogen gas concentration sensor 70 is mounted in the water supply tank 6. A dehumidification film 72 is provided on the sensor 70 to protect the latter from moisture residing in the tank 6. The electric signal coming from the hydrogen gas concentration sensor is delivered to a hydrogen gas concentration meter 71 incorporating an amplifier.

A carrier air blowing device 77 is provided for forcibly blowing carrier air 73 into the upper part of the space in the water supply tank 6. The carrier air blowing device 77 includes a blower 76 for blowing the carrier air and a filter 74 for filtrating and cleaning the carrier gas. A stop valve 75 is interposed between the blower 76 and the filter 74 so that the supply of the carrier air is made selectively depending on the state of the stop valve 75.

The operations of the blower 76 and the stop valve 75 are under the control of a monitor 78. The monitor 78 produces a signal for operating the stop valve 75 and the blower 76, while judging the state of the water cooling system, upon receipt of a signal from the hydrogen gas concentration meter 71.

This second embodiment of the invention operates in a manner explained hereinunder. In the event that a cracking or the like defect is caused in the water cooling system, the rate of rise of the hydrogen gas concentration in the upper space of the water supply tank 6 is increased. It is, therefore, possible to know the rate of invasion of the hydrogen gas through crack or cracks, by checking the change of concentration of hydrogen in the water supply tank 6 in relation to time.

Referring to FIG. 5, assuming here that the hydrogen gas concentration is increased from $C_1$ to $C_2$ in a length of time T, the rate of release of hydrogen gas per day is given by the following equation (2)

$$QH_2 \propto (C_2 - C_1)(24/T)[l/day] \quad (2)$$

where, $C_1$ and $C_2$ are minimum and maximum set concentrations of hydrogen gas. From equation (2) above, it will be seen that the rate of release of the hydrogen gas $QH_2$ is known from the time length T.

Since the teflon tube used as the hose 3 of FIG. 1 has a certain gas permeability, a leak of hydrogen gas in the order of several liters per day inevitably takes place even when there is no defect such as crack in the water cooling system including the hose 3. Therefore, in this second embodiment, the defect such as crack is detected by means of the time length T required for a given increase of the hydrogen gas concentration. Namely, when the time length T has come down below the reference time length Tn in the normal state, it is judged that a defect such as crack is generated in the water cooling system.

In order to conduct the above-explained algorithm at a sufficiently low level of hydrogen gas concentration much lower than the aforementioned explosion threshold concentration (4%), the aforementioned maximum hydrogen gas set concentration $C_2$ is selected to be lower than the explosion threshold concentration, e.g. about 1/10 to 1/12 of the latter, while the minimum set concentration $C_1$ is set at a level sufficiently high for the forecasting of the rate of release of the hydrogen gas in accordance with the equation (2).

Figure 6:
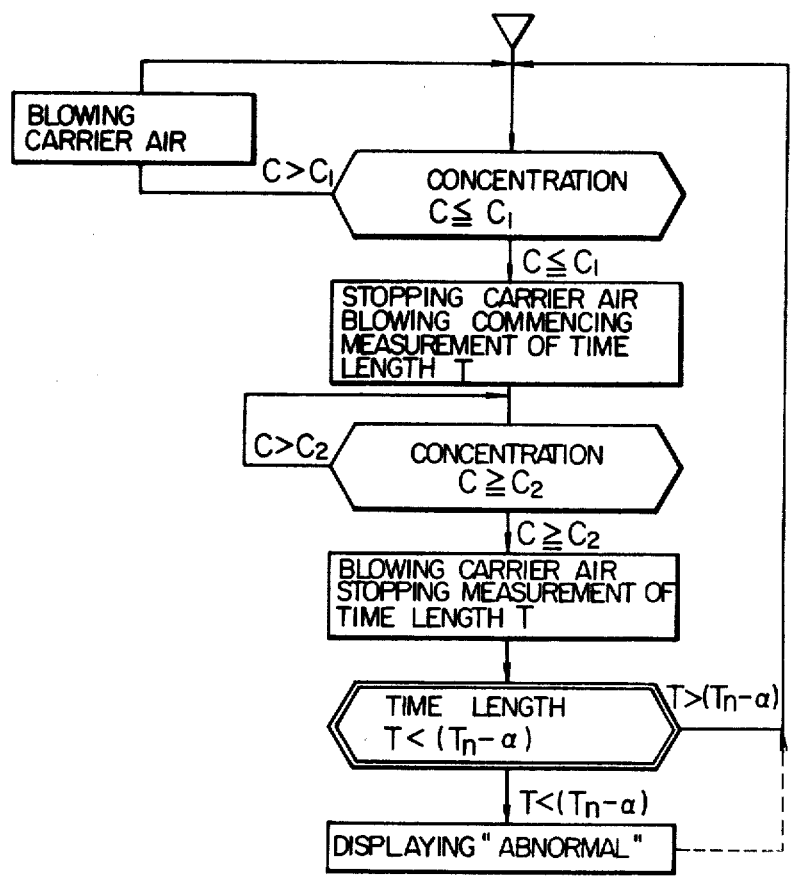
FIG. 6 shows the flow chart of the process of detecting a defect in the water cooling system.

FIG. 6 shows the flow chart of operation of the monitor device 78. The hydrogen gas concentration in the upper part of the space in the water supply tank 6, operation of the stop valve 75 and the operation of the blower 76 are shown at lower part of FIG. 5. First of all, a judgement is made as to whether the hydrogen concentration C at the upper part of space in the water supply tank 6 has reached the minimum set level $C_1$. If the minimum set concentration $C_1$ is not reached, the blower 76 of the carrier air blowing device 77 is started and the valve 75 is opened to blow the carrier air 73 into the water supply tank 6 through the filter 74, so that the hydrogen gas is discharged to the atmosphere to lower the concentration of the hydrogen gas.

When the minimum set value is reached, the blower 76 of the carrier air blowing device 77 is stopped and the valve 75 is closed to stop the forcible blowing of carrier air into the water supply tank 6. At the same time, the measurement of the time length T shown in FIG. 5 is commenced.

Then, a judgement is made as to whether the maximum set value of the hydrogen gas concentration $C_2$ is reached or not. If the condition of $C \geq C_2$ is confirmed by the judgement, the carrier air 73 is forcibly blown into the water supply tank 6 and, simultaneously, the measurement of the time length T is stopped. Then, whether there is any defect in the water cooling system is made through comparison of the measured time length T with the reference time length Tn. Preferably, the actual threshold value for the judgement concerning the defect is set at a level (Tn−α) which is slightly lower than that of the increase time in the normal state Tn, taking into account the measuring error and so forth. When it is judged that there is no defect, the carrier air is again blown into the water supply tank 6 forcibly and a judgement is made as to whether the hydrogen gas concentration is lowered to the minimum set concentration.

Figure 7:
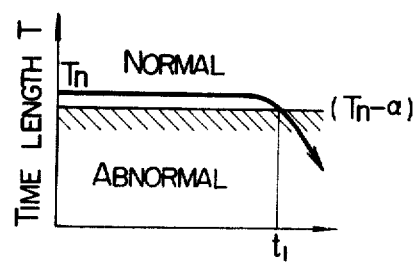
FIG. 7 is a pattern of increase of the hydrogen gas concentration as the reference for judgement of the state of the water cooling system.

When a defect is sensed as a result of the judgement, the increase time T (broken line in FIG. 6) is commenced again to reconfirm the defect, and the degree of defect, as well as the speed of development of the defect, is forecasted from the result of judgement and the rate of reduction of the time length T. Then, necessary measures are taken to instruct the display (not shown) of the monitor to cause the stopping of the operation and to indicate any necessary check. For instance, if the time length T is changed as shown in FIG. 7, the monitor device 78 makes a judgement at an instant $t_1$ that there is the possibility of occurrence of defect.

The blower 76 for forcibly blowing the air into the water supply tank 6 may be substituted by the compressed air source installed on the plant.

The increase of the hydrogen gas concentration in relation to time may be made by such a process as having steps of measuring the hydrogen gas concentration C at an instant time after the minimum set concentration $C_1$ is reached and calculating the rate of increase of the hydrogen concentration per unit time by the monitor device 78.

As has been described, in the second embodiment of the invention, the hydrogen concentration in the water supply tank is lowered to the level of a first set level and the rate of increase of the hydrogen gas concentration is observed by making this first set level as the reference, so that the defect in the water cooling system such as cracking is detected from the rate of increase of the hydrogen concentration in relation to time. It is therefore possible to detect the defect in the early period and without fail. In addition, after the second set level of the hydrogen gas concentration is reached in the water supply tank, the carrier air is forcibly blown into the water supply tank to lower the hydrogen concentration, so that the detection of defect is made always at a safe level of hydrogen concentration much lower than the explosion threshold concentration.

We claim:

1. A method of detecting defects in a water cooling system which is arranged for circularly supplying a cooling water into a hydrogen cooled electrical machine having a water cooling passage therein, said water cooling system including a water supply tank having a top wall with which said water supply tank defines above a pool of the cooling water therein an upper space communicating with the atmosphere through an air pipe, and means for supplying the cooling water from said water supply tank to said water cooling passage in said hydrogen cooled electrical machine, comprising the steps of
   i. blowing a carrier air at a predetermined constant flow rate to said upper space of said water supply tank so as to drive hydrogen gas accumulated in said upper space through said air pipe;
   ii. measuring hydrogen gas concentration in said carrier air flowing through said air pipe; and
   iii. judging whether any defect develops in said water cooling system or not, from the concentration measured.

2. A method according to claim 1, wherein the steps (i) and (ii) include blowing the carrier air and measuring the hydrogen gas concentration until the hydrogen gas concentration is lowered to a predetermined minimum concentration, stopping the blowing of the carrier air and measuring the hydrogen gas concentration for a period of time until the hydrogen gas concentration rises to a predetermined maximum concentration, and the step (iii) includes judging whether any defect develops from the length of the period of time for the hydrogen gas concentration to rise from the predetermined minimum concentration to the predetermined maximum concentration.

3. A method according to claim 1, wherein the step (ii) of measuring hydrogen gas concentration is carried out in accordance with the equation:

$$C_{H2} = Q_{air}/Q_{H2}$$

where
  $C_{H2}$ is the concentration of hydrogen (ppm);
  $Q_{air}$ is the flow rate of carrier air (l/hr); and
  $Q_{H2}$ is the rate of leaked hydrogen (l/hr).

4. A device for detecting defects in a water cooling system which is arranged for circularly supplying a cooling water into a hydrogen cooled electrical machine having a water cooling passage therein, said water cooling system including a water supply tank having a top wall with which said water supply tank defines above a pool of the cooling water therein an upper space communicating with the atmosphere through an air pipe, and means for supplying the cooling water from said water supply tank to said water cooling passage in said hydrogen cooled electrical machine; comprising:
   i. means for blowing a carrier air at a predetermined constant flow rate to said upper space of said water supply tank so as to drive hydrogen gas accumulated in said upper space through said air pipe;
   ii. means for measuring hydrogen gas concentration in said carrier air flowing through said air pipe; and
   iii. means for judging whether any defect develops in said water cooling system, from the concentration measured.

5. A device as set forth in claim 4, wherein said judging means is a monitoring device monitoring changes in the concentration.

6. A device as set forth in claim 5, wherein said blowing means comprises a blower unit having an outlet port opening to said upper space of said water supply tank.

7. A device as set forth in claim 6, wherein said water supply tank comprises a peripheral wall, and said outlet port of said blower unit and said air pipe are opened to said upper space of said water supply tank in an opposite relation through said peripheral wall.

8. A device as set forth in claim 4, wherein said measuring means comprises a detector disposed in said air pipe.

9. A device as set forth in claim 8, wherein a dehydrating unit is disposed in said air pipe upstream of said detector.

10. A device according to claim 4, wherein said blowing means is responsive to said measuring means for blowing the carrier air, said measuring means causing said blowing means to blow the carrier air until the hydrogen gas concentration is lowered to a predetermined minimum concentration and stopping said blowing means for a time period from the hydrogen gas concentration being lowered to the predetermined minimum concentration until the hydrogen gas concentration reaches a predetermined maximum concentration, said judging whether any defect develops from the length of the period of time for the hydrogen gas concentration to rise from the predetermined minimum concentration to the predetermined maximum concentration.

* * * * *